US012571975B2

(12) United States Patent
Liu et al.

(10) Patent No.: US 12,571,975 B2
(45) Date of Patent: Mar. 10, 2026

(54) PHOTOELECTRIC HYBRID DEVICE BASED ON GLASS WAVEGUIDE AND MANUFACTURING METHOD THEREOF

(71) Applicant: SHENNAN CIRCUITS CO., LTD., Shenzhen (CN)

(72) Inventors: Xiaofeng Liu, Shenzhen (CN); Hua Miao, Shenzhen (CN); Guodong Wang, Shenzhen (CN)

(73) Assignee: SHENNAN CIRCUITS CO., LTD., Shenzhen (CN)

( * ) Notice: Subject to any disclaimer, the term of this patent is extended or adjusted under 35 U.S.C. 154(b) by 264 days.

(21) Appl. No.: 18/212,211

(22) Filed: Jun. 21, 2023

(65) Prior Publication Data

US 2024/0288644 A1    Aug. 29, 2024

(30) Foreign Application Priority Data

Feb. 24, 2023    (CN) .......................... 202310196319.5

(51) Int. Cl.
*G02B 6/42*            (2006.01)

(52) U.S. Cl.
CPC ......... *G02B 6/4293* (2013.01); *G02B 6/4214* (2013.01); *G02B 6/4243* (2013.01); *G02B 6/428* (2013.01)

(58) Field of Classification Search
CPC ...... G02B 6/42; G02B 6/4293; G02B 6/4214; G02B 6/4243; G02B 6/428
See application file for complete search history.

(56) References Cited

U.S. PATENT DOCUMENTS

| | | |
|---|---|---|
| 6,845,184 B1 | 1/2005 | Yoshimura et al. |
| 7,005,719 B2 * | 2/2006 | Masumoto ........... G02B 6/4253 |
| | | 257/432 |
| 10,288,812 B1 | 5/2019 | Evans et al. |

(Continued)

FOREIGN PATENT DOCUMENTS

| | | |
|---|---|---|
| CN | 103762205 A | 4/2014 |
| CN | 110945976 A | 3/2020 |

(Continued)

OTHER PUBLICATIONS

Extended European Search Report of European Patent Application No. 23181413.8 issued on Dec. 20, 2023.

*Primary Examiner* — Tina Wong

(57)            ABSTRACT

Provided are a photoelectric hybrid device based on glass waveguide and manufacturing method thereof. The device comprises a first organic substrate, a glass substrate and a photoelectric chip; an inner side of an upper surface of the glass substrate is provided with a glass waveguide and an electrical interconnection structure communicating upper surface and a lower surface of the glass substrate; the photoelectric chip is installed on an outer side of the upper surface of the glass substrate, an electrical connection port of the photoelectric chip is connected with the electrical interconnection structure, and an optical connection port of the photoelectric chip is arranged opposite to a first end of the glass waveguide; and the lower surface of the glass substrate is connected with the first organic substrate, and also connected with the first conductive trace arranged in the first organic substrate through the electrical interconnection structure.

10 Claims, 2 Drawing Sheets

(56) References Cited

U.S. PATENT DOCUMENTS

| | | | | |
|---|---|---|---|---|
| 10,652,992 | B2 * | 5/2020 | Xie | H05K 1/144 |
| 2006/0023991 | A1 * | 2/2006 | Okubora | G02B 6/138 |
| | | | | 385/47 |
| 2009/0026565 | A1 * | 1/2009 | Noda | H05K 1/184 |
| | | | | 257/E31.127 |
| 2014/0177998 | A1 * | 6/2014 | Tseng | G02B 6/4214 |
| | | | | 385/14 |
| 2016/0170158 | A1 * | 6/2016 | Zheng | G02B 6/14 |
| | | | | 438/27 |
| 2020/0116928 | A1 * | 4/2020 | Kim | G02B 6/4204 |
| 2021/0041649 | A1 * | 2/2021 | Brusberg | H05K 1/0306 |
| 2022/0155539 | A1 * | 5/2022 | Pietambaram | G02B 6/4214 |
| 2023/0085761 | A1 * | 3/2023 | Witmer | G02B 6/423 |
| | | | | 385/16 |
| 2023/0090863 | A1 * | 3/2023 | Seneviratne | G02B 6/125 |
| | | | | 385/31 |
| 2023/0091050 | A1 * | 3/2023 | Zhang | G02B 6/43 |
| | | | | 385/31 |
| 2023/0105803 | A1 * | 4/2023 | Lu | G02B 6/12004 |
| | | | | 385/14 |
| 2023/0244045 | A1 * | 8/2023 | Kawamura | G02B 6/4231 |
| 2023/0411369 | A1 * | 12/2023 | Karhade | H01L 25/167 |
| 2023/0420432 | A1 * | 12/2023 | Suthram | H01L 23/3107 |

FOREIGN PATENT DOCUMENTS

| | | |
|---|---|---|
| CN | 112530925 A | 3/2021 |
| DE | 112015005575 T5 | 9/2017 |
| JP | 2014228566 A | 12/2014 |
| KR | 101216732 B1 | 12/2012 |
| WO | 2023018569 A1 | 2/2023 |

* cited by examiner

PHOTOELECTRIC HYBRID DEVICE BASED ON GLASS WAVEGUIDE AND MANUFACTURING METHOD THEREOF

CROSS REFERENCE TO RELATED APPLICATIONS

The present application claims the benefit of Chinese Patent Application No. 202310196319.5 filed on Feb. 24, 2023, the contents of which are incorporated herein by reference in their entirety.

TECHNICAL FIELD

The present application relates to the technical field of component packaging, in particular to a photoelectric hybrid device based on glass waveguide and a manufacturing method thereof.

BACKGROUND

With the rapid growth of internal traffic in data center, switch capacity, port density and interface speed will also face severe challenges. The data center switch system requires higher and higher performance indicators of optical modules, and data rate, transmission distance, power consumption and volume become important considerations. At present, the traditional data center switch system mainly adopts hot-plug optical modules assembled on the edge of printed circuit board (PCB). With the continuous increase of communication frequency and bandwidth, the switch chip on the main board of the switch would have a large transmission line loss due to the long PCB routing distance from the optical modules, which makes the power consumption of the switch system a bottleneck restricting the improvement of system performance.

In order to solve the above problems, the usual practice is to use glass as a support carrier, make polymer waveguides, conductive traces and package related chips on the glass carrier to realize photoelectric integration and interconnection. However, for polymer waveguide, although its manufacturing process is highly compatible with PCB, its temperature stability is poor, transmission loss is high, and its refractive index does not match well with optical fiber, which leads to high optical coupling loss.

SUMMARY

Based on this, it is necessary to provide a photoelectric hybrid device based on glass waveguide and a manufacturing method, for the purpose of solving the problem of high coupling loss of optical path using polymer waveguide, because the temperature stability of polymer waveguide is poor, the transmission loss is high, and the refractive index matching with optical fiber is not good.

In a first aspect, the present application provides a photoelectric hybrid device based on glass waveguide, including:

a first organic substrate, a glass substrate and a photoelectric chip;

an inner side of an upper surface of the glass substrate is provided with a glass waveguide and an electrical interconnection structure communicating the upper surface and a lower surface of the glass substrate;

the photoelectric chip is installed on an outer side of the upper surface of the glass substrate, an electrical connection port of the photoelectric chip is connected with the electrical interconnection structure, and an optical connection port of the photoelectric chip is arranged opposite to a first end of the glass waveguide, so that light passing through the first end enters the optical connection port; and the lower surface of the glass substrate is connected with the first organic substrate, and also connected with the first conductive trace arranged in the first organic substrate through the electrical interconnection structure, so that the first conductive trace is connected to the electrical connection port of the photoelectric chip.

The above solution has the following beneficial effects:

According to the photoelectric hybrid device based on glass waveguide, a glass substrate containing a glass waveguide is arranged on an organic substrate containing conductive traces to form a photoelectric hybrid substrate, a photoelectric chip arranged on the upper surface of the glass substrate transmits optical signals through the glass waveguide, and electrical signals are transmitted through the conductive traces to realize photoelectric hybrid interconnection. The coupling degree of optical path and optical transmission efficiency are improved by adopting the beneficial features of glass waveguide, i.e., good chemical durability and good refractive index matching with optical fiber.

Optionally, the first end of the glass waveguide is provided with a reflecting mirror at a preset angle, and the reflecting mirror is used for reflecting the light incident from a second end of the glass waveguide to the optical connection port of the photoelectric chip in a direction away from an upper surface of the first organic substrate.

Optionally, the photoelectric hybrid device further includes:

a second organic substrate arranged on the upper surface of the first organic substrate, the second organic substrate is provided with a groove, and the glass substrate is embedded in the groove; and a third organic substrate arranged on an upper surface of the second organic substrate; a light through hole is arranged in the third organic substrate, one end of the light through hole is connected with the second end, so that the light reflected by the reflecting mirror reaches the optical connection port of the external photoelectric chip through the light through hole.

Optionally, a second conductive trace is arranged in the third organic substrate, and the second conductive trace is connected with the electrical interconnection structure and the electrical connection port of the external photoelectric chip respectively.

Optionally, the glass substrate is positioned inside the first organic substrate, and the upper surface of the glass substrate and the upper surface of the first organic substrate are on the same plane.

Optionally, the photoelectric hybrid device further includes:

an optical connector, one end of the optical connector is connected to the second end of the glass waveguide, and another end is used for connecting an external optical path.

Optionally, the photoelectric hybrid device further includes:

a solder ball positioned on a lower surface of the first organic substrate, and the solder ball is connected with the first conductive trace.

In a second aspect, the present application provides a manufacturing method for a photoelectric hybrid device based on glass waveguide, including:

providing a first organic substrate, and preparing a first conductive trace on the first organic substrate;

providing a glass substrate, preparing a glass waveguide and an electrical interconnection hole connecting two sides of the glass substrate in an upper surface of the glass substrate, and preparing an electrical interconnection structure in the electrical interconnection hole;

integrating a lower surface of the glass substrate on the first organic substrate, so that the first conductive trace is connected with the electrical interconnection structure; and mounting a photoelectric chip on an upper surface of the glass substrate by flip chip, so an optical connection port of the photoelectric chip is opposite to a first end of the glass waveguide, so that light passing through the first end enters the optical connection port, and an electrical connection port of the photoelectric chip is connected with the first conductive trace.

The above solution has the following beneficial effects:

The manufacturing method of the photoelectric hybrid device based on glass waveguide of the application includes the following steps: preparing a conductive trace inside an organic substrate, preparing a glass waveguide inside the surface of a glass substrate, integrating the glass substrate on the upper surface of the organic substrate, and mounting the photoelectric chip on the upper surface of the glass substrate by flip chip to realize photoelectric hybrid interconnection. The coupling degree of optical path and optical transmission efficiency are improved by adopting the beneficial features of glass waveguide, i.e., good chemical durability and good refractive index matching with optical fiber.

Optionally, the step of integrating a lower surface of the glass substrate on the first organic substrate includes:

providing a second organic substrate, and milling a groove at a preset position of the second organic substrate according to a size of the glass substrate;

providing a third organic substrate, preparing a second conductive trace and a light through hole connecting two sides of the third organic substrate on the third organic substrate; and placing the second organic substrate on an upper surface of the first organic substrate, placing the glass substrate in the groove, and placing the third organic substrate on an upper surface of the second organic substrate; integrating the first organic substrate, the second organic substrate, the third organic substrate and the glass substrate by lamination, so that one end of the light through hole is connected with the first end of the glass waveguide.

Optionally, the step of integrating a lower surface of the glass substrate on the first organic substrate includes:

milling a groove at a preset position on the upper surface of the first organic substrate according to the size of the glass substrate; and fixing the glass substrate in the groove by gluing, so that the upper surface of the glass substrate and the upper surface of the first organic substrate are on the same plane.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

Figure 1:
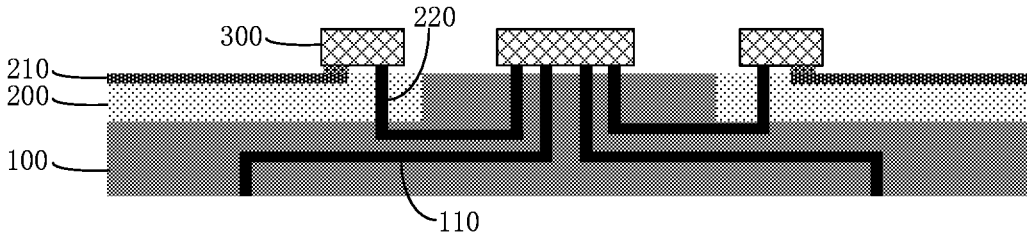
FIG. 1 is a structural schematic diagram of a first photoelectric hybrid device based on glass waveguide according to an embodiment of the present application.

Reference sings in the drawings are as follows:

100. First organic substrate; 110. First conductive trace; 200. Glass substrate; 210. Glass waveguide; 211. Reflecting mirror; 220. Electrical interconnection structure; 300. Photoelectric chip; 400. Second organic substrate; 500. Third organic substrate; 510. Light through hole; 520. Second conductive trace; 600. Optical connector; 700. Main control chip; 800. Solder ball.

DETAILED DESCRIPTION OF PREFERRED EMBODIMENTS

In order to make the to-be-solved technical problems, technical solutions and beneficial effects of the present application clearer, the present application will be described in further detail below with reference to embodiments.

It should be understood that the embodiments set forth below provide the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of this disclosure and the appended claims.

It should also be understood that although the terms first, second, etc. may be used herein to describe various elements, these elements should not be limited by these terms. These terms are only used to distinguish one element from another. For example, a first element may be referred to as a second element, and similarly, a second element may be referred to as a first element without departing from the scope of this disclosure. As used herein, the term "and/or" includes any and all combinations of one or more of the associated listed items.

It should also be understood that when an element is referred to as "connected" or "coupled" to another element, it may be directly connected or coupled to the other element, or intervening elements may be present. Conversely, when an element is referred to as being "directly connected" or "directly coupled" to another element, there are no intervening elements present.

It should also be understood that the terms "up", "down", "left", "right", "front", "back", "bottom", "middle" and "top" may be used to describe various elements here. The indicated orientation or position relationship is based on the orientation or position relationship shown in the attached drawings, which is only for the convenience of describing the present application and simplifying the description, and does not indicate or imply that the referred device or element must have a specific orientation, be constructed or operated in a specific orientation, so these elements shall not be limited by these terms.

These terms are only used to distinguish one element from another. For example, a first element may be referred to as an "upper" element, and similarly, a second element may be referred to as an "upper" element according to the relative orientation of these elements without departing from the scope of this disclosure.

It should also be understood that the terms "comprise" and/or "include" used in this specification specify the presence of said features, integers, steps, operations, elements and/or components, but do not exclude the presence or addition of one or more other features, integers, steps, operations, elements, components and/or groups. As used herein, the term "and/or" includes any and all combinations of related listed items.

Unless otherwise defined, all terms (including technical and scientific terms) used herein have the same meaning as commonly understood by one of ordinary skill in the art to which this disclosure belongs. It will be further understood that terms used herein should be interpreted as having meanings consistent with their meanings in the context of this specification and related technologies, and will not be interpreted in an idealized or overly formal sense unless explicitly defined herein.

In an embodiment, a photoelectric hybrid device based on glass waveguide as shown in FIG. 1 is provided, which includes a first organic substrate 100, a glass substrate 200 and a photoelectric chip 300. The inside of the upper surface of the glass substrate 200 is provided with a glass waveguide 210 and an electrical interconnection structure 220 communicating the upper surface and the lower surface of the glass substrate 200.

In this embodiment, the photoelectric chip 300 is installed outside the upper surface of the glass substrate 200, and the electrical connection port of the photoelectric chip 300 is connected to the electrical interconnection structure 220. And the optical connection port of photoelectric chip 300 is arranged opposite to the first end of glass waveguide 210, so that light entering from the second end of glass waveguide 210 enters the optical connection port of photoelectric chip 300 through the first end.

In this embodiment, the lower surface of the glass substrate 200 is connected with the first organic substrate 100, and the first conductive trace 110 arranged in the first organic substrate 100 is connected through the electrical interconnection structure 200, so that the first conductive trace 100 is connected with the electrical connection port of the photoelectric chip 300, thereby realizing the photoelectric interconnection of the photoelectric chip 300.

According to the photoelectric hybrid device based on glass waveguide provided by the embodiment, a glass substrate containing a glass waveguide is arranged on an organic substrate containing conductive traces to form a photoelectric hybrid substrate, a photoelectric chip arranged on the upper surface of the glass substrate transmits optical signals through the glass waveguide, and electrical signals are transmitted through the conductive traces to realize photoelectric hybrid interconnection. The coupling degree of optical path and optical transmission efficiency are improved by adopting the beneficial features of glass waveguide, i.e., good chemical durability and good refractive index matching with optical fiber.

Figure 2:
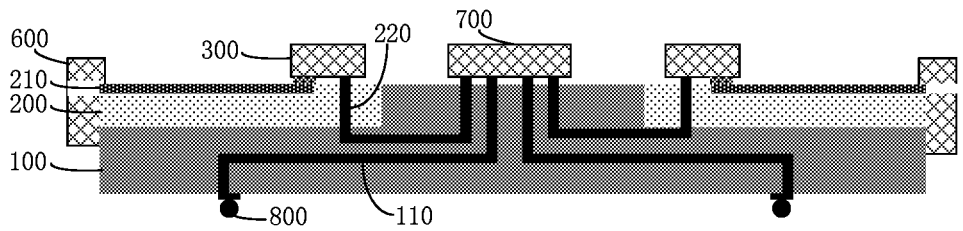
FIG. 2 is a structural schematic diagram of a second photoelectric hybrid device based on glass waveguide according to an embodiment of the present application.

In an embodiment, a photoelectric hybrid device based on glass waveguide as shown in FIG. 2 is provided, which includes: a first organic substrate 100, a glass substrate 200, a photoelectric chip 300, a main control chip 700, an optical connector 600 and a solder ball 800.

Wherein the upper surface of the first organic substrate 100 is provided with a groove, the glass substrate 200 is arranged in the groove, and the upper surface of the glass substrate 200 and the upper surface of the first organic substrate 100 are on the same plane, on the inner side of the upper surface of the glass substrate 200, that is, the shallow surface layer of the glass substrate 200 is provided with a glass waveguide 210 and an electrical interconnection structure 220 communicating the upper surface and the lower surface of the glass substrate 200.

In this embodiment, the photoelectric chip 300 is installed outside the upper surface of the glass substrate 200, and the electrical connection port of the photoelectric chip is connected to the electrical interconnection structure 220. And the optical connection port of photoelectric chip 300 is arranged opposite to the first end of glass waveguide 210, so that light entering from the second end of glass waveguide 210 enters the optical connection port of photoelectric chip 300 through the first end. The main control chip 700 is installed in the middle area of the first organic substrate 100. And the photoelectric chip 300 and the main control chip 700 are connected via the first conductive trace 110, so as to realize the electrical signal transmission between the photoelectric chip 300 and the main control chip 700.

In this embodiment, the lower surface of the glass substrate 200 is connected with the first organic substrate 100, and the first conductive trace 110 arranged in the first organic substrate 100 is connected through the electrical interconnection structure 200, so that the first conductive trace 100 is connected with the electrical connection port of the photoelectric chip 300, thereby realizing the photoelectric interconnection of the photoelectric chip 300.

In this embodiment, the optical connector 600 is arranged at the edge of the first organic substrate 100, one end of the optical connector 600 is connected to the second end of the glass waveguide, and another end of the optical connector 600 is connected to an external standard optical fiber, so that the glass waveguide can be plugged with the external optical fiber with low loss in simple manner, so as to receive the optical signal transmitted by the external light.

The lower surface of the first organic substrate 100 is also provided with a solder ball 800, the solder ball 800 is connected with the first conductive trace 110 in the first organic substrate 100, and the connection with external chips and circuits can be realized through the solder ball 800.

The photoelectric hybrid device based on glass waveguide in this embodiment has the following characteristics.

(1) Photoelectric chip transmits optical signals through glass waveguide, and transmits electrical signals through conductive trace to realize photoelectric hybrid interconnection of photoelectric chip. The coupling degree of optical path and optical transmission efficiency are improved by adopting the beneficial features of glass waveguide, i. e., good chemical durability and good refractive index matching with optical fiber.

(2) The glass substrate may be used as the reinforcement layer of the hybrid waveguide substrate, which makes the dimensional stability of the hybrid waveguide substrate better and the reliability of the packaging structure higher.

(3) The glass substrate is embedded into the first organic substrate, so that the thickness of the photoelectric hybrid substrate is reduced and the integration degree of the whole package is improved.

Figure 3:
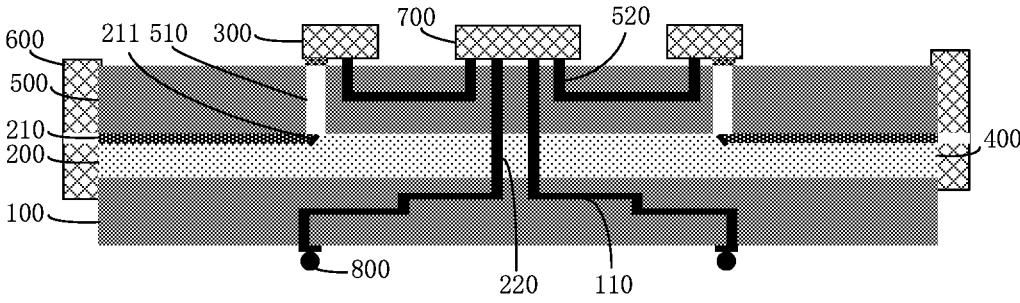
FIG. 3 is a structural schematic diagram of a third photoelectric hybrid device based on glass waveguide according to an embodiment of the present application.

In an embodiment, a photoelectric hybrid device based on glass waveguide is provided. As shown in FIG. 3, the device includes: a first organic substrate 100, a glass substrate 200, a photoelectric chip 300, a second organic substrate 400, a third organic substrate 500, a main control chip 700 and an optical connector 600.

Wherein, the first conductive trace 110 is arranged in the first organic substrate 100, and the second organic substrate 400 is arranged on the upper surface of the first organic substrate 100. A groove is arranged on the second organic substrate 400, and the glass substrate 200 is embedded in the groove of the second organic substrate 400. And the thickness of the second organic substrate 400 is the same as that of the glass substrate 200, such that the upper surface of the glass substrate 200 and the upper surface of the second organic substrate 400 are on the same plane, and the lower surface of the glass substrate 200 and the lower surface of the second organic substrate 400 are on the same plane.

In this embodiment, an electrical interconnection structure 220 perpendicular to the glass substrate 200 is arranged inside the glass substrate 200, and one end of the electrical interconnection structure 220 is connected with the first conductive trace 110; on the inner side of the upper surface of the glass substrate 200, i.e., the shallow surface layer of the glass substrate 200 is provided with a glass waveguide 210, and a reflecting mirror 211 with a preset angle is arranged at one end of the glass waveguide 200 away from the edge of the glass substrate 200. The reflecting mirror 211 is used to reflect the light incident from another end in a direction away from the upper surface of the first organic substrate 100 to the optical connection port of the photoelectric chip 300 arranged above. As a preferred parameter, the inclination angle of the reflecting mirror 211 may be set to 45°, so that the light incident in the horizontal direction is reflected as the light in the vertical direction.

In this embodiment, the glass waveguide 210 may be made by ion exchange, vapor deposition, radio frequency sputtering, sol gel, etc., and the glass waveguide with graded refractive index made by ion exchange is preferred. The reflecting mirror 211 with a preset angle may be made by wafer dicing, picosecond laser dicing, etc. The reflecting mirror 211 is made of metal material, which may be one of copper, silver, aluminum, nickel and or other materials, preferably copper or silver. The thickness of the reflecting mirror 211 is 10 nm-5 µm, preferably 100 nm-1000 nm.

The material of the glass substrate 100 may be pyrex glass, bk-7 glass, silica glass and fused silica glass, and the thickness of the glass substrate 100 is 0.1 mm-2 mm, preferably 0.5 nm-1 mm. The glass waveguide 210 on the glass substrate 200 replaces the traditional polymer-based waveguide, because the glass waveguide has lower cost, lower transmission loss, better chemical stability, excellent high temperature resistance and better aging resistance, and the refractive index of the glass is close to that of the optical fiber, so the glass waveguide and the optical fiber have good compatibility and can realize efficient optical coupling.

In this embodiment, the third organic substrate 500 is arranged on the upper surface of the second organic substrate 400 and the glass substrate 200. A second conductive trace 520 and a light through hole 510 are arranged inside the third organic substrate 500, wherein one end of the light through hole 510 is connected with one end of the glass waveguide 210 with the reflecting mirror 211, forming an optical path with the glass waveguide 210, and the light incident from the second end of the glass waveguide 210 is reflected into the light through hole 510 through the reflecting mirror 211, and then enters the optical connection port of the photoelectric chip 300, thereby realizing the transmission of optical signals.

A photoelectric chip 300 and a main control chip 700 are mounted by flip chip on the upper surface of the third organic substrate 500, wherein the photoelectric chip 300 includes an optical connection port and an electrical connection port. The optical connection port is located above the light through hole 510 to receive the light reflected from the reflecting mirror 211, and the electrical connection port is connected with the second conductive trace 520 in the third organic substrate 500. Meanwhile, the second conductive trace 520 is connected with the first conductive trace 110 in the first organic substrate 100 through the electrical interconnection structure 220 in the glass substrate 200. The main control chip 700 is connected with the electrical connection port of the photoelectric chip 300 through the second conductive trace 520, thereby forming an optical electrical interconnection structure.

In this embodiment, the number of photoelectric chip 300 and main control chip 700 may be set according to the actual design needs, and is not limited here. The number of layers of the first conductive trace 110 in the first organic substrate 100, and the number of layers of the second conductive trace 520 in the third organic substrate 500 may also be set according to the actual design needs, and are not limited here.

The lower surface of the first organic substrate 100 is also provided with a plurality of solder balls 800, and each solder ball 800 is connected with the first conductive trace 110 in the first organic substrate 100, and the connection with external chips and circuits can be realized through the solder ball 800.

In this embodiment, the optical connector 600 is arranged at the edge of the first organic substrate 100, one end of the optical connector 600 is connected to the second end of the glass waveguide, and another end of the optical connector 600 is connected to an external standard optical fiber, so that the glass waveguide can be plugged with the external optical fiber with low loss in simple manner, so as to receive the optical signal transmitted by the external light.

The photoelectric hybrid device based on glass waveguide in this embodiment has the following characteristics.

(1) Photoelectric chip transmits optical signals through glass waveguide, and transmits electrical signals through conductive trace to realize photoelectric hybrid interconnection of photoelectric chip. The coupling degree of optical path and optical transmission efficiency are improved by adopting the beneficial features of glass waveguide, i. e., good chemical durability and good refractive index matching with optical fiber.

(2) The glass substrate may be used as the reinforcement layer of the hybrid waveguide substrate, which makes the dimensional stability of the hybrid waveguide substrate better and the reliability of the packaging structure higher.

(3) A metal reflecting mirror is arranged at the end of the glass waveguide away from the glass substrate, which can improve the reflection efficiency of light and the transmission power of optical signals.

(4) The glass substrate containing glass waveguide is arranged between two organic substrates, which can increase the mechanical strength of the photoelectric hybrid substrate and improve the overall stability and reliability of the packaging structure.

Figure 4:
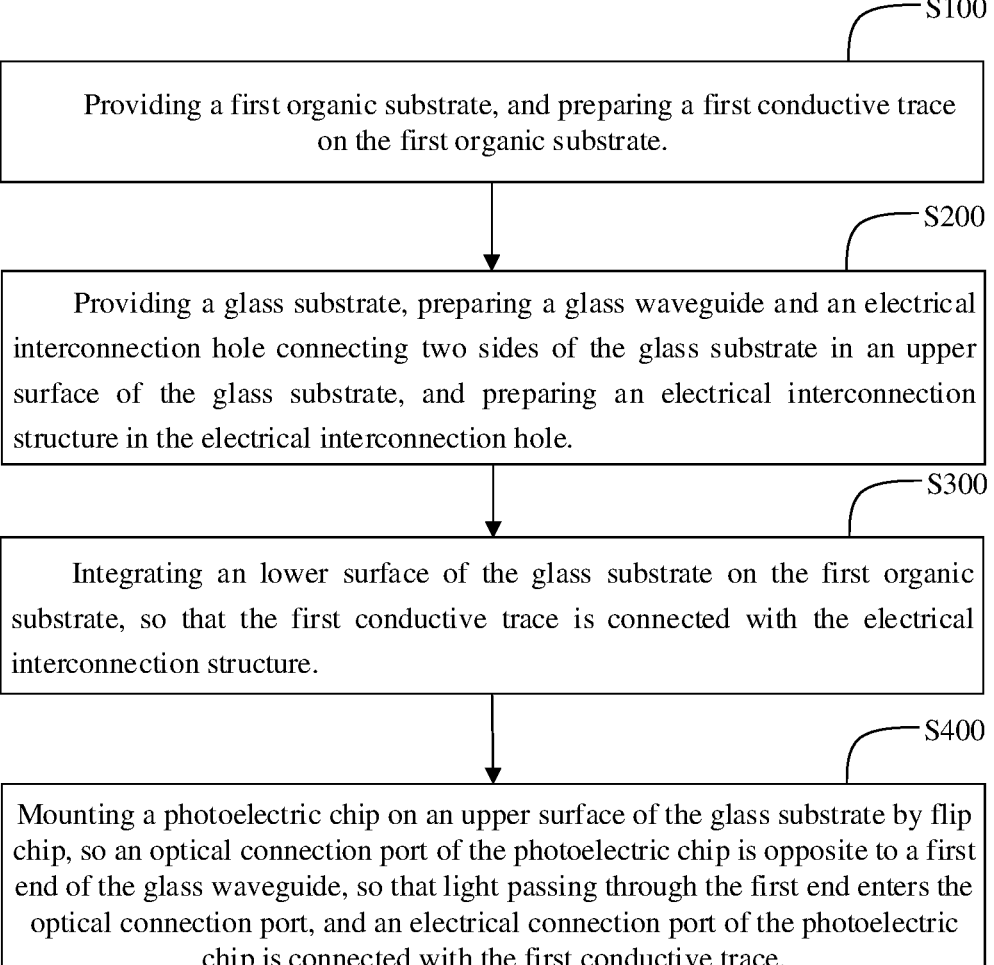
FIG. 4 is a schematic flow chart of a manufacturing method of a photoelectric hybrid device based on glass waveguide according to an embodiment of the present application.

In an embodiment, a manufacturing method of photoelectric hybrid device based on glass waveguide is provided. As shown in FIG. 4, the method may include the following steps:

Step S100: providing a first organic substrate, and preparing a first conductive trace on the first organic substrate.

According to the design requirements, an organic substrate with a certain thickness is provided, and then a conductive circuit is made on the surface of the organic substrate according to the designed circuit pattern. The specific method of making the conductive circuit is the same as that in the manufacturing process of printed circuit board, so it will not be repeated here.

Step S200: providing a glass substrate, preparing a glass waveguide and an electrical interconnection hole connecting two sides of the glass substrate in an upper surface of the glass substrate, and preparing an electrical interconnection structure in the electrical interconnection hole.

Providing a glass substrate with a certain thickness, which can be made of pyrex glass, bk-7 glass, silica glass and fused silica glass, and the thickness of the glass substrate is 0.1 mm-2 mm, preferably 0.5 mm-1 mm.

Etching the glass substrate by wet etching at the preset position of the glass substrate to form an electric interconnection hole penetrating the glass substrate, and the shape of the electric interconnection hole is not limited here, it can be round, square or any other shape. The number of electrical interconnection holes is set according to the actual packaging needs, which is not limited here. As other embodiments, laser and mechanical drilling may also be used to make the electrical interconnection hole.

A seed layer is formed by depositing metal material on the sidewall of the electrical interconnection hole by Physical Vapor Deposition (PVD) or Atomic Layer Deposition (ALD), and then copper is electroplated on the seed layer on the inner wall of the electrical interconnection hole and annealed to form an electrical interconnection structure located in the electrical interconnection hole.

In this embodiment, the glass waveguide 210 may be made by ion exchange, vapor deposition, radio frequency sputtering, sol gel, etc., and the glass waveguide with graded refractive index made by ion exchange is preferred. At the end of the glass waveguide away from the edge of the glass substrate, an inclined plane with a preset angle, preferably 45°, is made by wafer dicing, picosecond laser dicing, etc. And then metal is deposited on the inclined plane to form a reflecting mirror. The metal material may be one of copper, silver, aluminum, nickel and or other materials, preferably copper or silver. The thickness of the reflecting mirror 211 is 10 nm-5 μm, preferably 100 nm-1000 nm.

Step S300: integrating a lower surface of the glass substrate on the first organic substrate, so that the first conductive trace is connected with the electrical interconnection structure.

In this embodiment, the lower surface of the glass substrate is integrated on the first organic substrate in two ways.

The first way is: according to the size of the glass substrate, milling a groove at a preset position on the upper surface of the first organic substrate; fixing the glass substrate in the groove by ABF conductive adhesive, so that the upper surface of the glass substrate and the upper surface of the first organic substrate are on the same plane.

The second way is: providing a second organic substrate and a third organic substrate, then stacking three organic substrates, and drilling the stacked three organic substrates by using a drilling system, wherein drilling is mainly used for preparing a positioning hole in the plate and a positioning hole at the edge of the plate. The positioning hole in the plate is mainly used for aligning with the glass substrate during lamination, and the positioning hole at the edge of the plate is mainly used for aligning with the multilayer organic substrates during lamination and for aligning with the groove on the second organic substrate. Wherein, the glass substrate includes at least three positioning holes, and the three positioning holes are used for aligning with the second organic substrate through a pin.

According to the size of the glass substrate, milling a groove at the preset position of the second organic substrate by using the drilling system, and the number of grooves is the same as that of the glass substrate. Making a second conductive trace on the third organic substrate and a light through hole connecting the two sides of the third organic substrate.

Placing the second organic substrate on the upper surface of the first organic substrate, placing the glass substrate in the groove, and placing the third organic substrate on the upper surface of the second organic substrate. The first organic substrate, the second organic substrate, the third organic substrate and the glass substrate are integrated by lamination, so that one end of the light through hole is connected with the first end of the glass waveguide. During the lamination process, each organic substrate and the glass substrate are aligned through the positioning holes made by the drilling system. Glass substrate, first organic substrate and third organic substrate are bonded by at least one layer of pure glue with high transparency, wherein high transparency means that the light transmittance is greater than 85% at the communication wavelength.

As another embodiment, the first organic substrate, the second organic substrate, the third organic substrate and the glass substrate may be laminated without preparing the light through hole first. The light through hole is made on the upper surface of third organic substrate at the position corresponding to the reflecting mirror of glass waveguide, so that the reflecting mirror of glass waveguide is exposed.

Step S400: mounting a photoelectric chip on an upper surface of the glass substrate by flip chip, so an optical connection port of the photoelectric chip is opposite to a first end of the glass waveguide, so that light passing through the first end enters the optical connection port, and an electrical connection port of the photoelectric chip is connected with the first conductive trace.

For the photoelectric hybrid substrate prepared by the first way in step S300, the upper surface of the glass substrate is connected with the glass substrate through anisotropic conductive adhesive (ABF), so the optical connection port of the photoelectric chip is aligned with the end of the glass waveguide away from the glass substrate, so that light can be transmitted to the optical connection port of the photoelectric chip; thus the electrical connection port of the photoelectric chip is connected with the electrical interconnection structure.

For the photoelectric hybrid substrate prepared by the second way in step S300, the upper surface of the third organic substrate is connected with the glass substrate by anisotropic conductive adhesive (ABF), so the optical connection port of the photoelectric chip is aligned with the light through hole. The light reflected by glass waveguide through reflecting mirror can enter the optical connection port of photoelectric chip to realize optical signal transmission. Thus, the electrical connection port of photoelectric chip is connected with the second conductive trace to realize the transmission of electrical signals.

Finally, mounting the main control chip on the upper surface of the third organic substrate by flip chip, so the bonding pad of the main control chip is connected with the second conductive trace. The solder ball is planted on the lower surface of the first organic substrate, so the solder ball is connected with the first conductive trace.

The manufacturing method of photoelectric hybrid device based on glass waveguide in this embodiment has the following characteristics.

(1) Preparing a conductive trace inside an organic substrate, preparing a glass waveguide inside the surface of a glass substrate, integrating the glass substrate on the upper surface of the organic substrate, and flipping the photoelectric chip on the upper surface of the glass substrate to realize photoelectric hybrid interconnection. The coupling degree of optical path and optical transmission efficiency are improved by adopting the beneficial features of glass waveguide, i.e., good chemical durability and good refractive index matching with optical fiber.

(2) A fixing hole in the plate are made by the same drilling equipment, and the hole position of the glass substrate corresponds to the hole position of the organic substrate, so that the displacement of the glass substrate can be prevented during lamination, and the relative position accuracy of the glass substrate and the organic substrate can be improved.

(3) The pure glue with high transparency is adopted to bond the smooth glass waveguide substrate and the organic substrate, which can achieve good adhesion between them. The pure glue has better adhesion, and its good transparency can ensure less light loss caused by vertical reflection.

(4) With the adoption of specular reflection of 45°, the interconnection structure is relatively simple, which can improve the assembly efficiency of the system and further reduce the cost.

(5) Packaging the photoelectric chip by flip-chip using anisotropic conductive adhesive (ABF), which is beneficial to improve the optical transmission efficiency of the link.

The above embodiments are only used to illustrate the technical solution of the present application, rather than limit it. Although the application has been described in detail with reference to the foregoing embodiments, it should be understood by those skilled in the art that it is still possible to modify the technical solutions described in the foregoing embodiments, or equivalently replace some technical features thereof. These modifications and equivalents do not make the nature of the corresponding technical solution deviates from the spirit and scope of the present application, and shall be included in the protection scope of the present application.

What is claimed is:

1. A photoelectric hybrid device based on glass waveguide, comprising:

a first organic substrate, a glass substrate and a photoelectric chip;

an upper surface of the first organic substrate is provided with a groove, the glass substrate is arranged in the groove, an upper surface of the glass substrate and the upper surface of the first organic substrate are on the same plane, an inner side of the upper surface of the glass substrate is provided with a glass waveguide and an electrical interconnection structure communicating the upper surface and a lower surface of the glass substrate;

the photoelectric chip is installed on an outer side of the upper surface of the glass substrate, an electrical connection port of the photoelectric chip is connected with the electrical interconnection structure, and an optical connection port of the photoelectric chip is arranged opposite to a first end of the glass waveguide, so that light passing through the first end enters the optical connection port; and the lower surface of the glass substrate is connected with the first organic substrate, and also connected with a first conductive trace arranged in the first organic substrate through the electrical interconnection structure, so that the first conductive trace is connected to the electrical connection port of the photoelectric chip, the glass substrate is used as a reinforcement layer, to improve the packaging reliability of the photoelectric hybrid device.

2. The photoelectric hybrid device of claim 1, wherein the first end of the glass waveguide is provided with a reflecting mirror at a preset angle, and the reflecting mirror is used for reflecting the light incident from a second end of the glass waveguide to the optical connection port of the photoelectric chip in a direction away from the upper surface of the first organic substrate.

3. The photoelectric hybrid device of claim 2, wherein the photoelectric hybrid device further comprises:

a second organic substrate arranged on the upper surface of the first organic substrate, the second organic substrate is provided with a groove, and the glass substrate is embedded in the groove; and a third organic substrate arranged on an upper surface of the second organic substrate; a light through hole is arranged in the third organic substrate, one end of the light through hole is connected with the second end, so that the light reflected by the reflecting mirror reaches the optical connection port of the external photoelectric chip through the light through hole.

4. The photoelectric hybrid device of claim 3, wherein a second conductive trace is arranged in the third organic substrate, and the second conductive trace is connected with the electrical interconnection structure and the electrical connection port of the external photoelectric chip respectively.

5. The photoelectric hybrid device of claim 1, wherein the glass substrate is positioned inside the first organic substrate, and the upper surface of the glass substrate and the upper surface of the first organic substrate are on the same plane.

6. The photoelectric hybrid device of claim 1, wherein the photoelectric hybrid device further comprises:

an optical connector, one end of the optical connector is connected to the second end of the glass waveguide, and another end is used for connecting an external optical path.

7. The photoelectric hybrid device of claim 1, wherein the photoelectric hybrid device further comprises:

a solder ball positioned on a lower surface of the first organic substrate, and the solder ball is connected with the first conductive trace.

8. A manufacturing method of a photoelectric hybrid device based on glass waveguide, comprising providing a first organic substrate, and preparing a first conductive trace on the first organic substrate;

providing a glass substrate, an upper surface of the first organic substrate is provided with a groove, the glass substrate is arranged in the groove, an upper surface of the glass substrate and the upper surface of the first organic substrate are on the same plane, preparing a glass waveguide and an electrical interconnection hole connecting two sides of the glass substrate in the upper surface of the glass substrate, and preparing an electrical interconnection structure in the electrical interconnection hole;

integrating a lower surface of the glass substrate on the first organic substrate, so that the first conductive trace is connected with the electrical interconnection structure; and mounting a photoelectric chip on the upper surface of the glass substrate by flip chip, so an optical connection port of the photoelectric chip is opposite to a first end of the glass waveguide, so that light passing through the first end enters the optical connection port, and an electrical connection port of the photoelectric chip is connected with the first conductive trace, the glass substrate is used as a reinforcement layer, to improve the packaging reliability of the photoelectric hybrid device.

9. The manufacturing method of the photoelectric hybrid device of claim 8, wherein the step of integrating a lower surface of the glass substrate on the first organic substrate comprises:

providing a second organic substrate, and milling a groove at a preset position of the second organic substrate according to a size of the glass substrate;

providing a third organic substrate, preparing a second conductive trace and a light through hole connecting two sides of the third organic substrate on the third organic substrate; and placing the second organic substrate on the upper surface of the first organic substrate, placing the glass substrate in the groove, and placing the third organic substrate on an upper surface of the second organic substrate; integrating the first organic substrate, the second organic substrate, the third organic substrate and the glass substrate by lamination, so that one end of the light through hole is connected with the first end of the glass waveguide.

10. The manufacturing method of the photoelectric hybrid device of claim 8, wherein the step of integrating a lower surface of the glass substrate on the first organic substrate comprises:

milling the groove at a preset position on the upper surface of the first organic substrate according to the size of the glass substrate; and fixing the glass substrate in the groove by gluing, so that the upper surface of the glass substrate and the upper surface of the first organic substrate are on the same plane.

* * * * *